United States Patent [19]

Murray et al.

[11] Patent Number: 5,346,706
[45] Date of Patent: Sep. 13, 1994

[54] MALT BEVERAGE PROCESS

[75] Inventors: Cameron R. Murray; William J. Van Der Meer, both of London, Canada

[73] Assignee: John Labatt Limited, London, Canada

[21] Appl. No.: 967,275

[22] Filed: Oct. 27, 1992

Related U.S. Application Data

[63] Continuation-in-part of Ser. No. 783,332, Oct. 28, 1991, abandoned.

[51] Int. Cl.$^5$ ............................................. C12C 11/00
[52] U.S. Cl. ........................................ 426/11; 426/13; 426/16; 426/29; 426/592
[58] Field of Search ................ 426/11, 12, 13, 16, 426/28, 29, 7, 14, 15, 18, 30, 64, 62, 590, 592, 600, 330.4

[56] References Cited

U.S. PATENT DOCUMENTS

| | | | |
|---|---|---|---|
| 1,302,552 | 5/1919 | Heuser | 426/16 |
| 3,852,495 | 12/1974 | Schimpf et al. | 426/14 |
| 4,661,355 | 4/1987 | Schur | 426/14 |
| 4,746,518 | 5/1988 | Schur | 426/15 |
| 4,970,082 | 11/1990 | Huige et al. | 426/16 |
| 4,971,807 | 11/1990 | Schur et al. | 426/16 |

FOREIGN PATENT DOCUMENTS 5342529 11/1988 Japan .

OTHER PUBLICATIONS

Hough, J. . et al. Malting and Brewing Science, vol. II Hopped Wort and Beer, pp. 692–695 and 791–797, Chapman and Hall, London, 1971.

*Primary Examiner*—Donald E. Czaja
*Assistant Examiner*—Leslie Wong
*Attorney, Agent, or Firm*—Fisher, Christen & Sabol

[57] ABSTRACT

A cold contact process for the production of non-alcoholic malt beverages comprising the steps of preparing a boiled malt wort of about 12–20 degrees Plato; acidifying the wort through the addition of an edible acid, to a pH of greater than about 4.0, and less than 4.6. To the acidified wort is added an amount of about 25% to 75% wet packed yeast slurry suspended in a freshly harvested regularly brewed, barm beer. The slurry is added in sufficient proportions to produce a yeast cell concentration in the resulting wort/slurry mixture, of about 40 million to 80 million yeast cells per milliliter thereof. The yeast and the wort are held in contact in the mixture for greater than 10, up to a maximum of 30 hours, at a temperature of greater than zero up to a maximum of less than 7 degrees Centigrade. The resulting beverage is then aged after separating the thusly contacted wort from all but 0.5–2 million yeast cells per milliliter of the separated wort. The resulting product may be organoleptically supplemented with beer ester flavors to form an ester and beer-flavor supplemented mixture which is then diluted with water to produce a non-alcoholic malt beverage.

29 Claims, No Drawings

MALT BEVERAGE PROCESS

This application is a continuation-in-part application of the commonly assigned, copending U.S. application Ser. No. 7/783332, filed Oct. 28, 1991, now abandoned.

FIELD OF THE INVENTION

The present invention relates to a process for producing malt beverages, and to malt beverages produced thereby; and especially to non-alcoholic malt beverages, and to a cold-contact brewing process for producing same.

BACKGROUND OF THE INVENTION

Diverse and varied brewing techniques have for many years been proposed or practiced with a view to producing low-alcohol beers or non-alcoholic malt beverages. For the present purposes, "beer" is a malt-beverage product having an alcohol content in the range of three to five and one half percent, on a volume basis. "Low-alcohol beer" is herein distinguished from "beer" on the basis of their respective alcohol contents, with the former's being in the range of one to three percent, also on a volume by volume basis. "Non-alcoholic malt beverages" on the other hand have alcohol contents that are equal to or less than one half of one percent, (again on a volume by volume basis).

Although efforts to produce alcohol-reduced malt beverages are hardly a recent phenomenon, socially responsible consumption and general health awareness have renewed interest in the possibilities of such products. The historical difficulty of achieving acceptable consumer taste profiles at manageable capital and production cost persists, however, as the principle hurdle to acceptance of products of this type.

Prior efforts have included the use of yeasts that lack the ability to ferment certain sugars (such as Sacch. ludwigii, for example); interrupted fermentation techniques; high temperature mashing techniques; the "Barrel system"; alcohol rectification, including distillation, evaporation, reverse osmosis, and dialysis techniques. These processes have resulted in products of limited commercial success. Such historical approaches to alcohol reduction or repression of alcohol production, have adversely affected taste profiles or involved high capital or energy costs, or limited production throughputs.

Cold contact processes have also been utilized in the production of non-alcoholic beverages. Japanese Kokai 53-127861, for example, discloses a process in which a wort of fifteen to twenty-five percent Balling, at low temperatures (between minus five and ten degrees Centigrade, and preferably between two and minus two degrees Centigrade), is contacted with one and one-half to two weight percent of yeast, for a period of between sixteen and seventy-two hours. The yeast is removed, and the beverage is finished through dilution with water to achieve the desired alcohol content; carbonation; and acidification with lactic acid to sharpen the inherently sweet taste which is often characteristic of products of this and other cold-contact processes.

Another cold contact process is described in U.S. Pat. Nos. 4,661,355 and 4,746,518, according to which a dilute, (six to twelve percent solids), acidified wort, (pH of about 4), is contacted with an alcohol-free yeast for about twenty-four to forty-eight hours at a temperature of below zero degrees Centigrade. Yeast separation and carbonation follow, to produce a beverage having only a nominal alcohol content.

Yet another cold contact process is described in published Canadian Patent Application 2,027,651. That publication describes a process for producing a non-alcoholic malt beverage. The process entails contacting a slurry containing at least ten percent yeast suspended in fresh regular green beer, with a wort having fourteen to twenty percent extract by weight. The wort and slurry are mixed in the necessary relative proportions to produce a yeast cell count of not less than one hundred million cells per milliliter of mixture. Note that the patentee originally taught that concentrations of one hundred and thirty million cells per milliliter were essential to the process, only to later discover that the minimum could be pushed to as low as the one hundred million cells now taught as the minimum amount essential for the purposes of that process. Contact is sustained at temperatures of between three and seven and one half degrees Centigrade for a period of between one half and ten hours. The beverage is finished through carbonation and dilution to reduce the alcohol content to meet the non-alcoholic specification.

U.S. Pat. No. 4,971,807 discloses another process for producing a low alcohol content beer in which process a relatively small amount of ascorbic acid is added to the wort. The wort is then boiled or heated at a temperature of above 80 degrees Centigrade, for at least half an hour, during which time the ascorbic acid reacts to eliminate bitter after-taste producing substances that are oxidation products arising out of the malt roasting process. The ascorbic acid according to this patented process is substantially eliminated during this reaction, and hence has no other effect on the wort. It may be noted that adding ascorbic acid without heating is stated by the patentee to be ineffective.

SUMMARY OF THE INVENTION

In accordance with the present invention, there is provided a process for the production of a non-alcoholic malt beverage, the conditions of which flavor, on a taste evaluation basis, minimization of undesirable aldehyde flavourants while at the same time avoiding any substantial ethanol production. The combination of steps in accordance with the present process are adapted to repress yeast growth sufficiently to avoid substantial fermentation and associated ethanol and diacetyl production, while at the same time ensuring that the yeasts are sufficiently active to reduce undesirable aldehyde flavourants present in the wort, and final beverage. Moreover, the latter has been found to have enhanced stability relative to regular beer.

Accordingly, there is provided a cold contact process for the production of non-alcoholic malt beverages, which process comprises the steps set out herein below.

A boiled malt wort having a Plato value of greater than 12 up to about 20 degrees, is first prepared. The wort is boiled to drive off up to about 20% of its original weight, of water. Typically between 7% and 15% should be boiled off, with about 10% being preferred. Boiling as prescribed, is believed to reduce the aldehyde content of the wort, thereby avoiding some of the off-flavors that are chronically associated with cold contact beers produced in accordance with prior processes. A preferred wort is one of about 16 degrees Plato. This for example could be produced by preparing an initial wort of 14 degrees Plato, boiling off about 10% of that initial wort by weight, to produce a post boil wort of about 16 degrees Plato. Note that Plato values of 12 or less fail to take advantage of the mass-action effects in aldehyde reduction during contact of the wort with the yeast, and require that larger amounts of water be carried through processing. This is a disadvantage of the processes as set out in the previously mentioned US patents.

The wort is acidified through the addition of an edible acid, to a pH greater than 4.0. Preferably the pH is reduced to less than pH 5.0, and a pH of about 4.5 is particularly preferred. Although any edible acid could be used for this purpose, citric acid is preferred. Reducing the pH of the wort, and hence the pH of the finished beverage, has the effect of assisting the yeast action and compensating for the characteristically sweet flavor associated with non-alcoholic malt beverages produced by cold contact methods. A reduction of pH to 4 or less, however, results in too sharp a taste in the final product. As contemplated herein, the amount of acid added should be sufficient to enhance in the reduction of the aldehyde concentration in the wort, but should not over compensate for the sweetness of the beverage, and will generally be from about 150 to 350 ppm, (ie. from 0.15 to 0.35 grams per liter, of wort).

Note that in the above cited Canadian patent publication, the yeast cells are initially prepared by way of an "acid wash". This is a known technique that is used to help prevent bacterial infection from entering brewing processes in yeast inoculum. The acid wash, however, exposes the yeasts to relatively high hydrogen ion concentrations, thereby shocking them, and could diminish their ability to reduce aldehydes after they are added to the wort.

Similarly, the addition of acid in the finishing steps according to the Japanese reference compensates for the sweet flavor of the beverage, but comes too late to facilitate aldehyde reduction during the contact period between the yeast and the wort.

An amount of a slurry of about 25-75%, (preferably about 35-70% and especially preferably about 70%), by volume of wet packed yeast slurry suspended in a regularly brewed, barm beer, is added to the wort, in sufficient proportions to produce a yeast cell concentration in the resulting wort/slurry mixture of about 40 million to 80 million yeast cells per milliliter thereof. Preferably the yeast cells number in the range of about 50 to 60 million cells per milliliter of the mixture. It is very important that the yeast be freshly harvested and, in particular, that it not be stored for more than 24 hours, it being especially preferred that the yeast be stored for not more than 12 hours, following its being extracted from its original fermentation, prior to being used in accordance with the present invention.

It is again noted that the applicant in connection with the above noted Canadian patent publication originally taught that a minimum of 135 million cells per milliliter were required for the purposes of producing a non-alcoholic malt beverage under realistic contact temperatures and times. Even after having actively and critically reconsidered that technical limitation, the same applicant was unwilling to reduce its assessment of the minimum required cell count to anything less that 100 million.

In accordance with the present invention, it has been found to be disadvantageous to use such high yeast cell concentrations. More specifically, it has been found that, without the time/cost penalty of pre-centrifugal processing, conventional brewing centrifuges will only efficiently handle yeast cell concentrations of up to about 80 million cells per milliliter. To remove higher cell concentrations, particularly when the suspending medium is a cold, thick, syrupy wort, using such equipment, requires either additional capital expenditure to install additional or oversized centrifuges, or the acceptance of a processing bottleneck that is inconsistent with the Canadian patent applications stated interest in a process for enhancing throughput using existing brewing equipment. Thus in accordance with the present invention, it has now been found, surprisingly, that not only is it possible to run a non-alcoholic cold contact malt beverage process at substantially less than 100 million cells per milliliter, (in contradiction to the teaching of the above noted reference), but it is positively advantageous to do so and thereby operate within the normal efficacious operating ranges of conventional brewing equipment, without compromising the ability to produce a beverage having a balanced taste profile well within the bounds of consumer taste panel acceptability.

Although barm beer (with its yeast content) or other yeast slurries are preferred in accordance with the practice of the present invention, it is possible that the required numbers of extracted fresh yeast cells could otherwise be entrained in a manufactured beer slurry, and used in the practice of the present invention. That being the case, it will be appreciated that such other slurries will be equivalent to, and therefore embraced within the scope the references made herein to yeast slurried in barm beer.

The yeast and the wort are maintained in contact in the mixture for greater than 10, up to a maximum of 30 hours. In a preferred embodiment the contact is continued for greater than 10 hours, up to about 24 hours. An especially preferred embodiment is where the contact is continued for about 16 hours.

Contact is carried out at temperatures of greater than zero up to a maximum of less than 7 degrees Centigrade. Preferably, the contact temperature is between about 2 and 5 degrees Centigrade, with about 3 degrees being especially preferred.

It is highly advantageous to mix (or agitate the yeast-/wort mixture) and, preferably, to do so by sparging the mixture with carbon dioxide, during the contact period. The agitation, however it is accomplished, is advantageous, and specifically the throughput of sparging carbon dioxide gas will also help to scavenge any residual oxygen in the mixture, and at the same time help to maintain uniformity of contact conditions between the yeast cells and the wort. The sparging physically "rolls" the yeast slurry/wort mixture. Some degree of incidental carbonation, can be collaterally accomplished with the desired "rolling" action, particularly if the cold-contact is carried out under pressure.

Following the contact period, the resulting beverage is aged, as a preliminary to which the contacted wort is separated from all but 0.5-2 million cells per milliliter of the separated wort. The residual cells hold a particular advantage in that they continue to reduce undesirable aldehydes and control dissolved oxygen levels during the aging procedure. Moreover, in cold-contact processes which encourage yeast fermentation, such as that which is the subject of the earlier mentioned Canadian patent publication, the retention of yeast during the aging process holds potential for engendering the risk of diacetyl production, with concomitant damage to the flavor profile of the resulting beverage.

Preferably aging proceeds at a reduced temperature, but above zero degrees Centigrade, as this suppresses yeast activity sufficiently to avoid any substantial diacetyl production while at the same time ensuring that the yeast remains sufficiently active to continue to reduce residual aldehydes remaining in the beverage. The process can be carried out at temperatures of as low as minus one and one half degrees, however. It should be noted that the amount of residual yeast and the conditions used ensure that substantially no secondary fermentations (such as krausening) occurs, which being highly undesirable according to the practice of the present invention.

The wort is organoleptically supplemented (meaning, of course, flavor enhanced), with beer ester flavors. Beer esters and their contribution to the flavor of beers and beer-based products is well known to one skilled in the art as reference to any standard text will demonstrate, (refer for example to "Malting and Brewing Science", Volume II—Hopped Wort and Beer, Second Edition, published by Chapman and Hall). Commercially available synthetic beer esters can be employed, provided applicable labelling laws are followed. Natural beer esters from regular beer can also be employed. Preferably, however, the aged wort is admixed with an ester supplementing amount of a regularly brewed beer which also increases the ethanol concentration of the mixture, to say not more than about 2% v/v. In a preferred form, the added beer is a concentrated beer from a high gravity brew, (eg a mature beer following yeast separation), and which, for example, could have an ethanol concentration in the range of about 6 to 8% v/v, and preferably about 7% v/v., prior to the dilution thereof that is normally employed to reduce the ethanol concentration to about 5% v/v. Preferably the ethanol concentration in the resulting mixture is in the range of about 1.1–1.4% v/v, with about 1.3% v/v being especially preferred.

The mixture is finally diluted with sufficient water to produce a non-alcoholic beverage, preferably with an ethanol concentration of less than 0.5% v/v, and a calculated original extract of about 4 to 7 degrees Plato, (with a range of 5 to 6 degrees Plato being especially preferred).

DETAILED DESCRIPTION OF A PREFERRED EMBODIMENT

Example 1

Four hundred and two hectolitres of wort having a Plato value of 14.5 were prepared by mashing 5190 kilograms of Brewer's malt; 850 kilograms of Carastan malt; 2400 kilograms of corn starch adjunct; 29 kilograms of calcium chloride; and 8.75 kilograms of citric acid (eg sufficient to effect a concentration of 0.24 grams per liter of wort); into 440 hectolitres of water. The wort was hopped to 42 bitterness units, and boiled to achieve a 10% boil-off. The wort was thereby reduced in volume to 365 hectolitres, with an increased extract of about 16 degrees Plato and a pH of about 4.6.

Three hundred and fifty hectolitres of this wort was added to the fermenter at a temperature of about 3 degrees Centigrade, and this temperature was maintained throughout the cold contact step.

Yeast was pitched at a rate of about 2 kilograms per hectolitre of wort, using a fresh slurry (less than 12 hours old), comprised of 70% by volume yeast in barm beer. This resulted in a yeast cell concentration of about 60 million cells per milliliter.

The contact was continued for about 16 hours, with carbon dioxide sparging for about three of those hours, at a rate of about one liter per hectolitre of wort, per minute. The desirable consequential mixing action aids in making the contact conditions more uniform, especially with respect to temperature.

Thereafter, the wort was centrifuged to reduce the cell content to about one half million cells per milliliter of the contacted wort, at which level the wort was aged for five days at a temperature of between 0.5 and 1.5 degrees Centigrade. Sufficiently concentrated, but otherwise regularly brewed beer having an ethanol content of 7.3% v/v, was added to increase the ester concentration of the wort, and resulted in an increase in the ethanol concentration of the wort to about 1.3% v/v. The wort was diluted with about 980 hectolitres of water to produce a malt beverage having an ethanol concentration of 0.36% v/v, and a calculated original extract of 5.5 degrees Plato.

Carbonation to about three volumes, bottling, and pasteurization (at 15 to 20 "Pasteurization Units"—PU), followed. Similarly produced beverages according to the present invention were characterized by consumer taste panels as significantly preferable to another, commercially produced low-alcohol product. Moreover, the product was stable for an extended period of time—ie greater than six months.

I claim:

1. A cold contact process for the production of nonalcoholic malt beverages comprising the steps of:
   i) adding an amount of yeast slurry containing about 25% to 75% wet packed yeast slurry suspended in a fresh regularly brewed, beer, to a boiled malt wort of from about 12 to 20 degrees Plato and a pH of greater than 4.0 and less than about 5.0 and containing about 150 to 350 ppm w/v of said wort of an edible acid; and wherein said amount of said slurry is sufficient to produce a yeast cell concentration in the resulting wort/slurry mixture of about 40 million to 80 million yeast cells per milliliter thereof;
   ii) contacting said yeast and said wort in said mixture for greater than about 10, up to a maximum of about 30 hours, at a temperature of greater than about zero up to a maximum of less than about 7 degrees Centigrade;
   iii) separating the thusly contacted wort from all but from 0.5 to 2 million cells per milliliter of the separated wort and aging the resulting beverage;
   iv) organoleptically supplementing said wort with beer ester flavors to form a mixture; and,
   v) diluting the resulting beverage as necessary with water to produce a nonalcoholic malt beverage.

2. The process according to claim 1 wherein said wort/slurry mixture is agitated during said contacting.

3. The process according to claim 1 wherein said water is dearated and chilled.

4. The process according to claim 1 wherein up to 20% by weight of said wort is boiled off.

5. The process according to claim 4 wherein from 7 to 15% by weight of said wort is boiled off.

6. The process according to claim 5 wherein about 10% by weight of said wort is boiled of.

7. The process according to claim 1 wherein said boiled wort is about 16 degrees Plato.

8. The process according to claim 1 wherein the pH of said wort is reduced to about pH 4.5.

9. The process according to claim 1 wherein said pH is reduced through the addition of citric acid to said wort.

10. The process according to claim 9 wherein said addition in the amount of about 250 ppm of said acid.

11. The process according to claim 1 wherein said mixture contains between 50 to 70 million yeast cells per milliliter thereof.

12. The process according to claim 11 wherein said mixture contains between 55 to 65 million yeast cells per milliliter thereof.

13. The process according to claim 1 wherein said contact is continued for greater than 10 hours, up to about 24 hours.

14. The process according to claim 13 wherein said contact is continued for about 16 hours.

15. The process according to claim 1 wherein said temperature is between about 2 and 5 degrees Centigrade.

16. The process according to claim 15 wherein said temperature is about 3 degrees Centigrade.

17. The process according to claim 1 wherein carbon dioxide is sparged through said mixture.

18. The process according to claim 1 wherein aging temperature is reduced, but is above zero degrees Centigrade.

19. The process according to claim 1 wherein said wet packed yeast slurry is in the range of 25% to 70% by volume.

20. The process according to claim 19 wherein said wet packed yeast slurry is about 70% by volume.

21. The process according to claim 1 wherein said fresh regularly brewed beer is less than about twelve hours old.

22. The Process according to claim 1 wherein said yeast is less than 24 hours old when used in said process.

23. The process according to claim 22, wherein said yeast is less than 12 hours old when used in said process.

24. The process according to claim 1 wherein said non-alcoholic malt beverage has an ethanol concentration of less than about 0.5% v/v.

25. The process according to claim 1 wherein the step of organoleptically supplementing said wort comprises adding an ester-supplementing amount of regularly brewed beer to said wort to form a mixture having an ethanol concentration of not more than about 2% v/v.

26. The process according to claim 1 wherein the ethanol concentration in said mixture is between 1.1 and 1.4% v/v.

27. The process according to claim 26 wherein the ethanol concentration of said mixture is about 1.3% v/v.

28. The process according to claim 1 wherein said water is fruit juice flavored.

29. The process according to claim 28 wherein said water is fruit juice.

* * * * *